(12) United States Patent
Boehm et al.

(10) Patent No.: US 10,744,743 B2
(45) Date of Patent: Aug. 18, 2020

(54) SYSTEM AND METHOD FOR PREVENTING OR ARRESTING CORROSION ON INFRASTRUCTURES WITH AN IMPERVIOUS BARRIER

(71) Applicant: Enviropeel USA, Indianapolis, IN (US)

(72) Inventors: Kenneth Lee Boehm, Indianapolis, IN (US); Simon David Haycox, Sutton Coldfield (GB)

(73) Assignee: Precision Cams Inc., Indianapolis, IN (US)

( * ) Notice: Subject to any disclaimer, the term of this patent is extended or adjusted under 35 U.S.C. 154(b) by 395 days.

(21) Appl. No.: 15/064,854

(22) Filed: Mar. 9, 2016

(65) Prior Publication Data

US 2016/0263864 A1 Sep. 15, 2016

Related U.S. Application Data

(60) Provisional application No. 62/130,795, filed on Mar. 10, 2015.

(51) Int. Cl.
*B32B 15/08* (2006.01)
*B32B 37/14* (2006.01)
(Continued)

(52) U.S. Cl.
CPC .......... *B32B 15/08* (2013.01); *B29C 63/0017* (2013.01); *B32B 3/08* (2013.01); *C09D 5/08* (2013.01); *E01D 19/083* (2013.01); *E04H 12/2292* (2013.01); *B05B 1/24* (2013.01); *B32B 2250/02* (2013.01); *B32B 2255/06* (2013.01); *B32B 2255/10* (2013.01); *B32B 2255/26* (2013.01); *B32B 2307/7242* (2013.01);
(Continued)

(58) Field of Classification Search
CPC . F16B 33/06; B32B 3/08; B32B 15/08; B32B 2250/02; B32B 2255/06; B32B 2255/10; B32B 2255/26; B32B 2307/7242; B32B 2307/7265; B32B 2307/752; B32B 2419/00; C09D 5/08; E01C 11/05; E01D 19/08; E01D 19/083; E01D 22/00; E04H 12/2292
See application file for complete search history.

(56) References Cited

U.S. PATENT DOCUMENTS

2002/0119252 A1* 8/2002 Haycox .................... B05D 5/00
427/374.4
2007/0034316 A1* 2/2007 Perez ...................... B29C 63/14
156/95

(Continued)

FOREIGN PATENT DOCUMENTS

JP 2004132113 A * 4/2004

OTHER PUBLICATIONS

A&E Group, Alocit Systems, Dec. 2009, A&E Group, p. 1, Retrieved Online Mar. 30, 2018 (Year: 2009).*

*Primary Examiner* — Maria V Ewald
*Assistant Examiner* — Ethan Weydemeyer
(74) *Attorney, Agent, or Firm* — Carla Gannon Law

(57) ABSTRACT

Corrosion on industrial infrastructures can be prevented or arrested using a multi-stage system and method having an optional epoxy primer, a thermoplastic layer, a self-amalgamating water-cure wrap, and a top coat of epoxy. The resulting impervious barrier resists corrosion and withstands abuse from the elements.

11 Claims, 5 Drawing Sheets

(51) Int. Cl.
    *E04B 1/64*           (2006.01)
    *B32B 37/00*         (2006.01)
    *B32B 3/08*           (2006.01)
    *E01D 19/08*         (2006.01)
    *E04H 12/22*         (2006.01)
    *B29C 63/00*         (2006.01)
    *C09D 5/08*          (2006.01)
    *B05B 1/24*          (2006.01)

(52) U.S. Cl.
    CPC . *B32B 2307/7265* (2013.01); *B32B 2307/752* (2013.01); *B32B 2419/00* (2013.01)

(56) References Cited

U.S. PATENT DOCUMENTS

2008/0317962 A1* 12/2008 Hayes ................ B05D 7/16
                                                          427/409
2013/0273342 A1* 10/2013 Johnson ............ C08G 18/2825
                                                          428/220

* cited by examiner

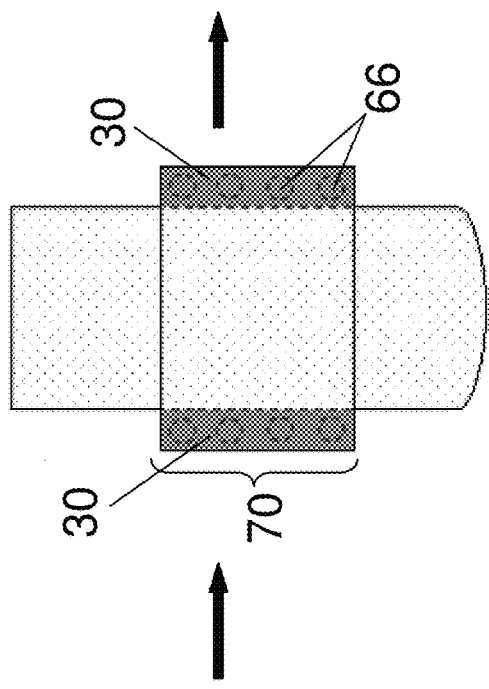
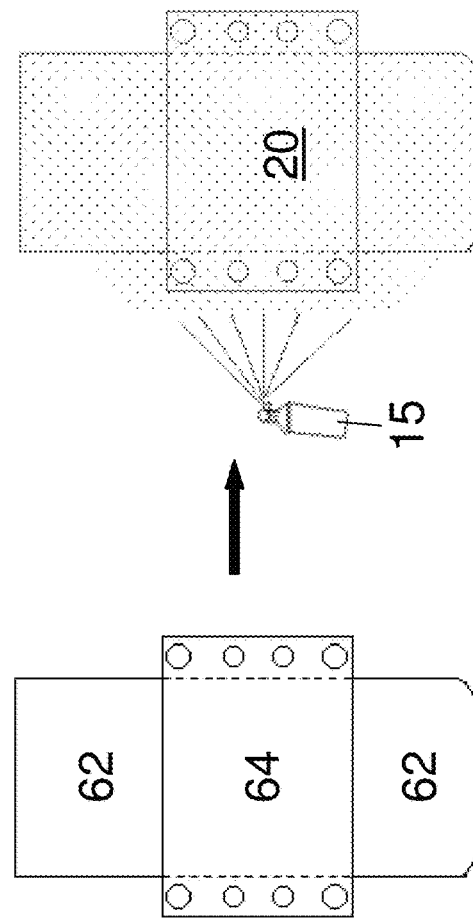
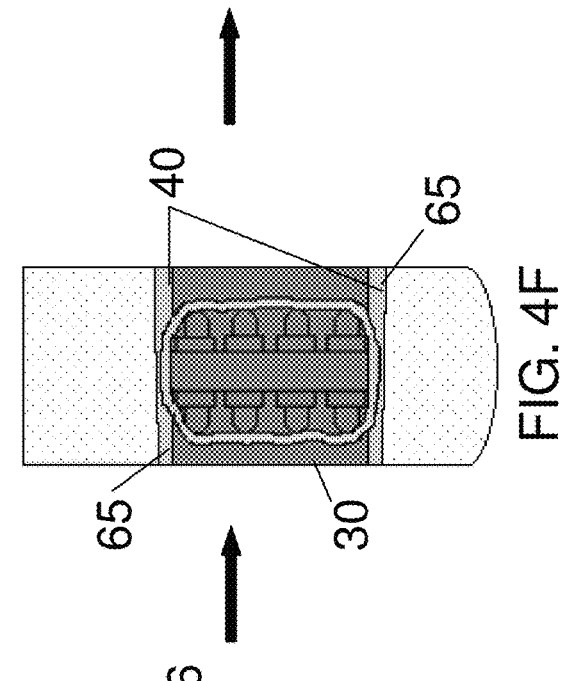
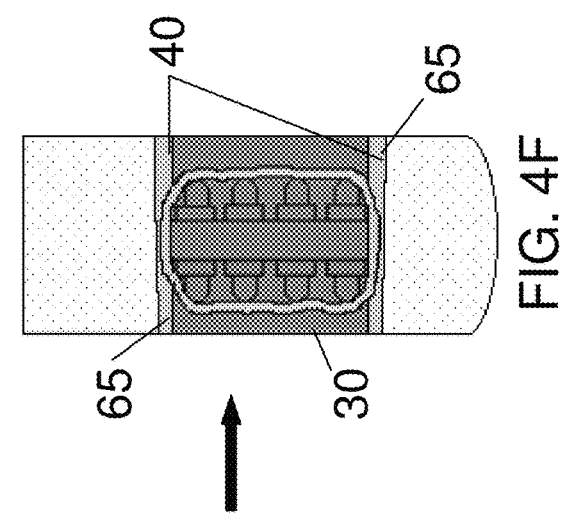
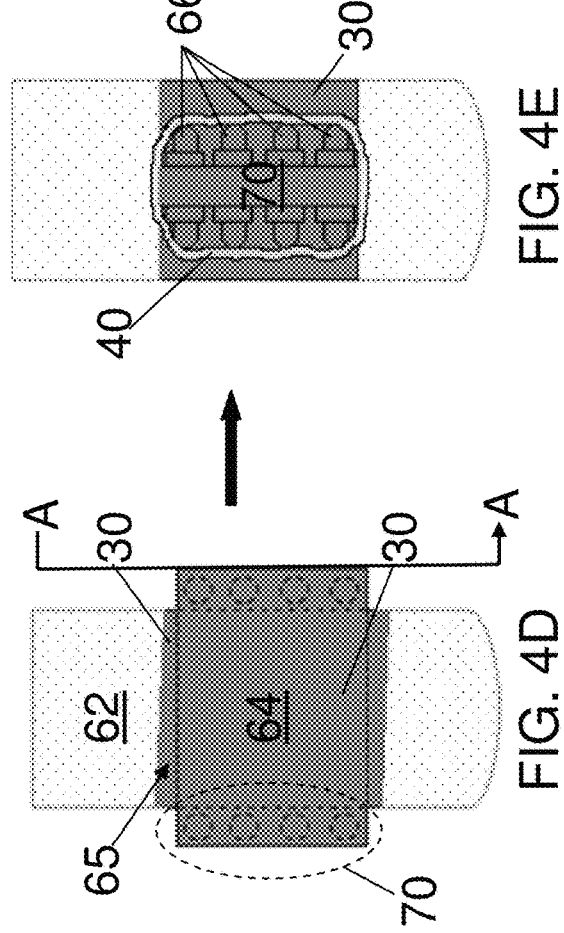
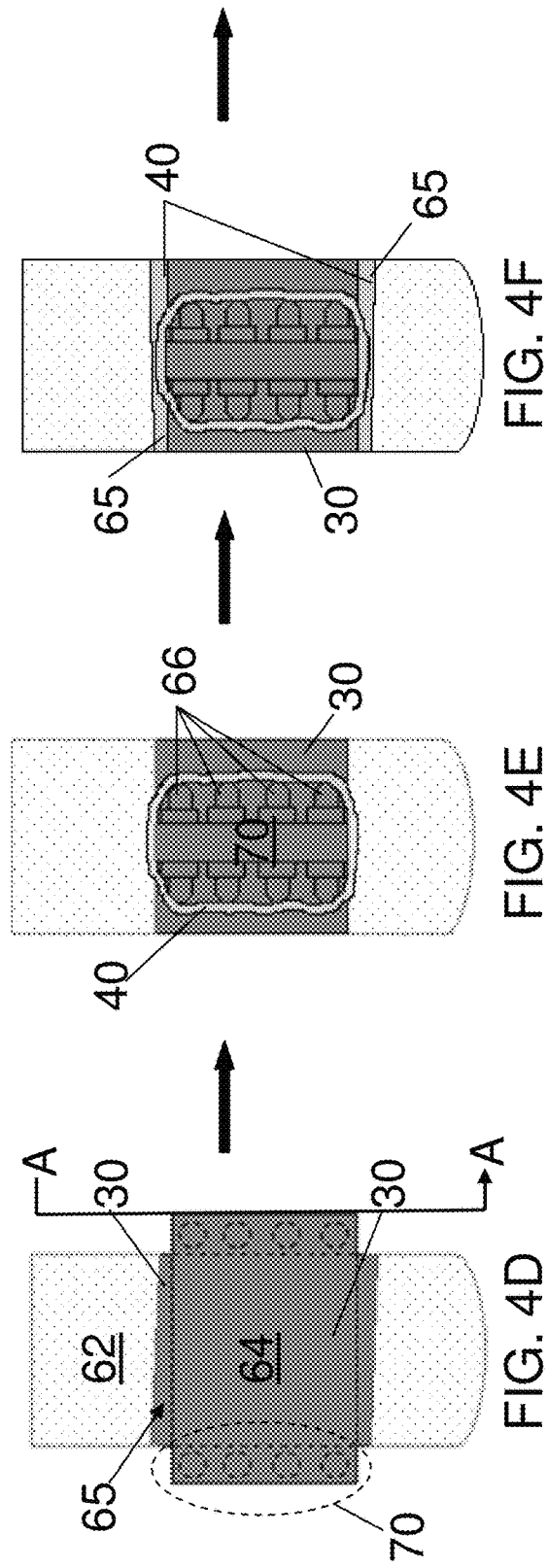

SYSTEM AND METHOD FOR PREVENTING OR ARRESTING CORROSION ON INFRASTRUCTURES WITH AN IMPERVIOUS BARRIER

CROSS-REFERENCE TO RELATED APPLICATIONS

This application claims the benefit of U.S. Provisional Patent Application 62/130,795, filed on Mar. 10, 2015, entitled SYSTEM FOR PREVENTING OR ARRESTING CORROSION ON OIL RIGS.

BACKGROUND

Field

The present invention relates generally to preventing or arresting corrosion, and more particularly, to systems and methods of preventing or arresting corrosion on infrastructures, using an impervious barrier of a combination of epoxy, wrap and thermoplastic.

Related Art

Infrastructures including industrial installations are often located in environments that contribute to the overall deterioration of the infrastructure. Examples include oil platforms, pier supports and bridges that contend with waves, temperature changes and seawater; and mining operations having a prevalence of dust, chemicals and minerals. Corrosion, in particular, is an ongoing challenge for various infrastructures. Not only can corrosion cause catastrophic failure in large structures such as girders and gas pipelines, the corrosion of fasteners such as bolted assemblies affects the safety and function of the systems that they are holding together.

Riser clamps are an example of a bolted assembly, and are an essential part of oil and gas production infrastructure. They attach umbilicals and flowlines to the main rig structure. They are difficult to protect from the destructive forces of the weather and the ocean, and even harder to repair once corrosion has started.

Bolting assemblies used in marine environments are usually constructed of low alloy steel, or of corrosive-resistant alloys having copper, nickel, stainless steel, or titanium. Low alloy steel, and ASTM A193 B7 and A320 L7 in particular, are the most widely used material in bolting assemblies for marine oil and gas infrastructures because they are less expensive and more readily available than corrosion-resistant alloys. Unfortunately, however, low alloy steel is susceptible to corrosion.

Various methods have been employed to prevent corrosion of low alloy steel bolting assemblies, including zinc and cadmium electroplating, polytetrafluoroethylene (PTFE) coating, sheradising, and spin galvanizing. While these methods may impart some anti-corrosion benefits, they are of limited effectiveness and/or duration.

Thus, there remains a need for a system and method for preventing or arresting corrosion on infrastructures. It is desirable that this system and method can be used above water, below water, and in the splash zone between; can be used on a variety of substrates regardless of size or shape; is long lasting, environmentally friendly and recyclable; and effective against a variety of corrosive agents and environmental assaults.

SUMMARY OF THE INVENTION

The present invention pertains to systems and methods for preventing or arresting corrosion on infrastructures such as bridges and piers, and industrial infrastructures such as oil and gas rigs, mining operations, and power generating plants such as solar fields and nuclear installations. It is also very effective against environmental elements such as wind, UV, mechanical forces, abrasive forces, vibrational motions, soil to air interfaces, waves, rain, sleet, snow, hail, temperature changes, dust and dirt.

An impervious barrier is created using a multi-stage system and method having an optional epoxy primer, a thermoplastic layer, a self-amalgamating water-cure wrap, and a top coat of epoxy. This prevents the formation of corrosion, and arrests the further development of corrosion, on corrosion-prone components of industrial infrastructures such as riser clamps. The method may be performed above water, then placed under water once the barrier system is properly cured. The system can be use above water, under water or in the splash zone. The barrier is easily removed in sections if desired, and exposed areas can be patched.

BRIEF DESCRIPTION OF THE DRAWINGS

FIGS. 3A-3F depict a method of forming a barrier on a riser clamp used above water, with:
FIG. 3A—an untreated riser clamp;
FIG. 3B—a primed riser clamp;
FIG. 3C—thermoplastic applied to studs;
FIG. 3D—thermoplastic applied to remainder of riser clamp;
FIG. 3E—riser clamp and neck wrapped; and
FIG. 3F—epoxy applied to thermoplastic and wrapped areas;

FIGS. 4A-4J depict a method of forming a barrier on a riser clamp used in the splash zone, with:
FIG. 4A an untreated riser clamp;
FIG. 4B—a primed riser clamp;
FIG. 4C—thermoplastic applied to studs;
FIG. 4D—thermoplastic applied to remainder of riser clamp;
FIG. 4E—studs wrapped;
FIG. 4F—top neck wrapped;
FIG. 4G—bottom neck wrapped;
FIG. 4H—top neck and overlapping studs wrapped;
FIG. 4I—wrapping downward until totally wrapped; and
FIG. 4J—epoxy applied.

DESCRIPTION OF THE PREFERRED EMBODIMENTS

Figure 1:
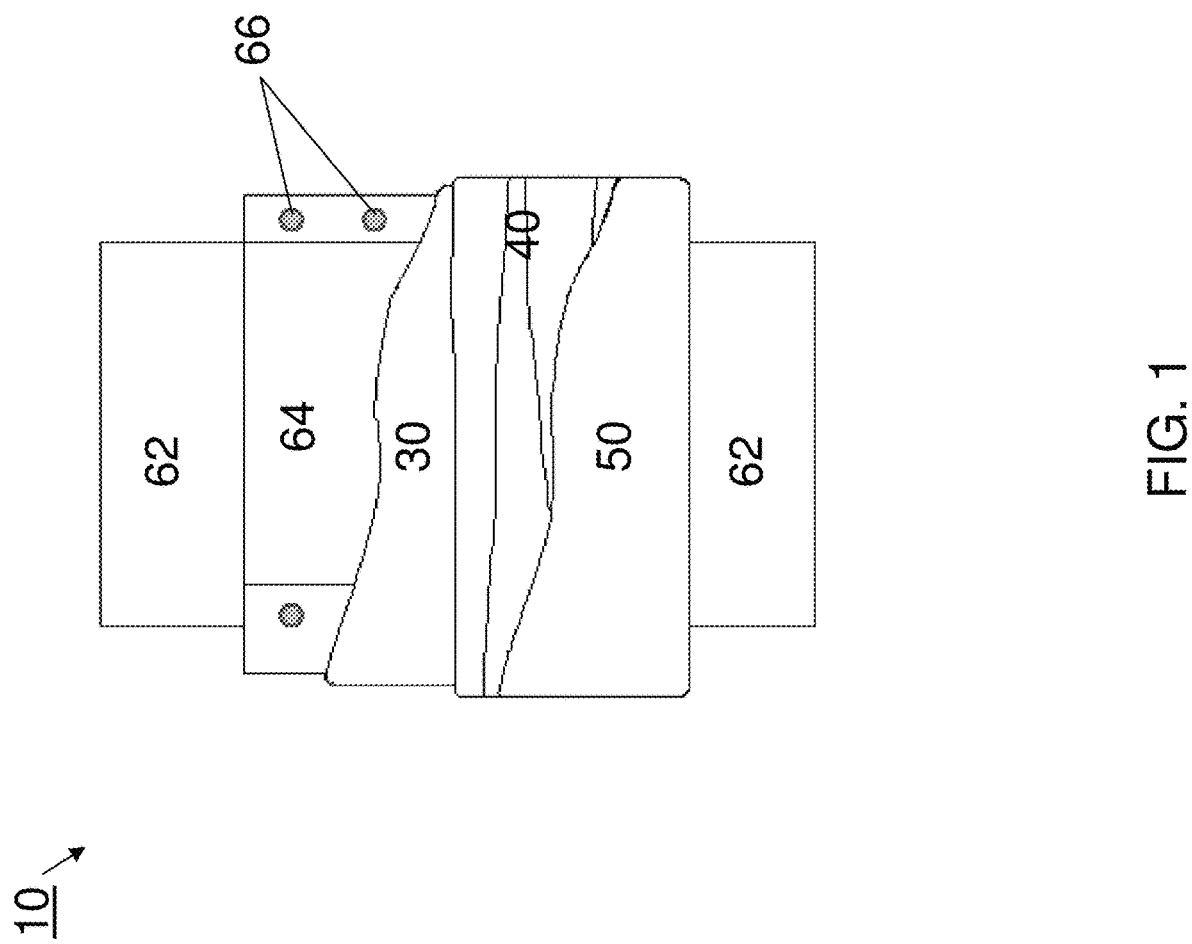
FIG. 1 illustrates a riser clamp with layers of the barrier shown.

In the following description, the following reference characters designate corresponding parts throughout the several views:

10—Barrier system;
15—Sprayer;
20—Primer;
30—Thermoplastic;
31—Outer skin;
32—Inhibitor layer;
40—Wrap;
50—Epoxy
60—Encapsulation region;
62—Pipe;
63—Bolting assembly;
64—Riser clamp;

65—Neck;
66—Bolt;
67—Nut;
68—Flange;
69—Crevice; and
70—Stud.

The following definitions shall apply:

"Approximately" and the like shall mean+/−10% unless otherwise stated or impossible.

"Substantially" and the like shall mean generally to be true, but allowing for material irregularities, human variances, unusual circumstances and the like.

"Industrial infrastructure" and the like shall refer to components associated with installations such as gas platforms, mines, and power generation plants such as nuclear power plants and solar fields.

"Infrastructure" and the like shall refer to man-made structures including roads, bridges, piers, walkways, buildings, rails-based transportation, docks, as well as industrial infrastructure.

"Impervious" and the like shall mean no signs of corrosion or water ingressions at 10,000 hours in accordance with ASTM B1117 (Revision 2011).

"Neck" shall refer to the sections of pipe near a bolting assembly.

"Splash zone" and the like shall refer to regions that are sometimes above water, sometimes below water, and sometimes partially submerged in water. Variances can be due to tidal action, waves, wind, or fluctuations in water level.

"Substrate" shall refer to the area receiving a barrier, typically a bolting assembly such as a riser clamp, and the sections of pipe adjoining the bolting assembly.

It should be understood that the descriptions and illustrations explain preferred embodiments of the inventions, and are not intended to limit the inventions thereto.

FIG. 1 provides an overview of the multiple layers of barrier system 10 applied to pipe 62 and riser clamp 64. The layer closest to riser clamp 64 is thermoplastic 30, which is covered with wrap 40, which is sealed by epoxy 50. Primer 20, not shown, is optionally applied to riser clamp 64 before thermoplastic 30.

Figure 2:
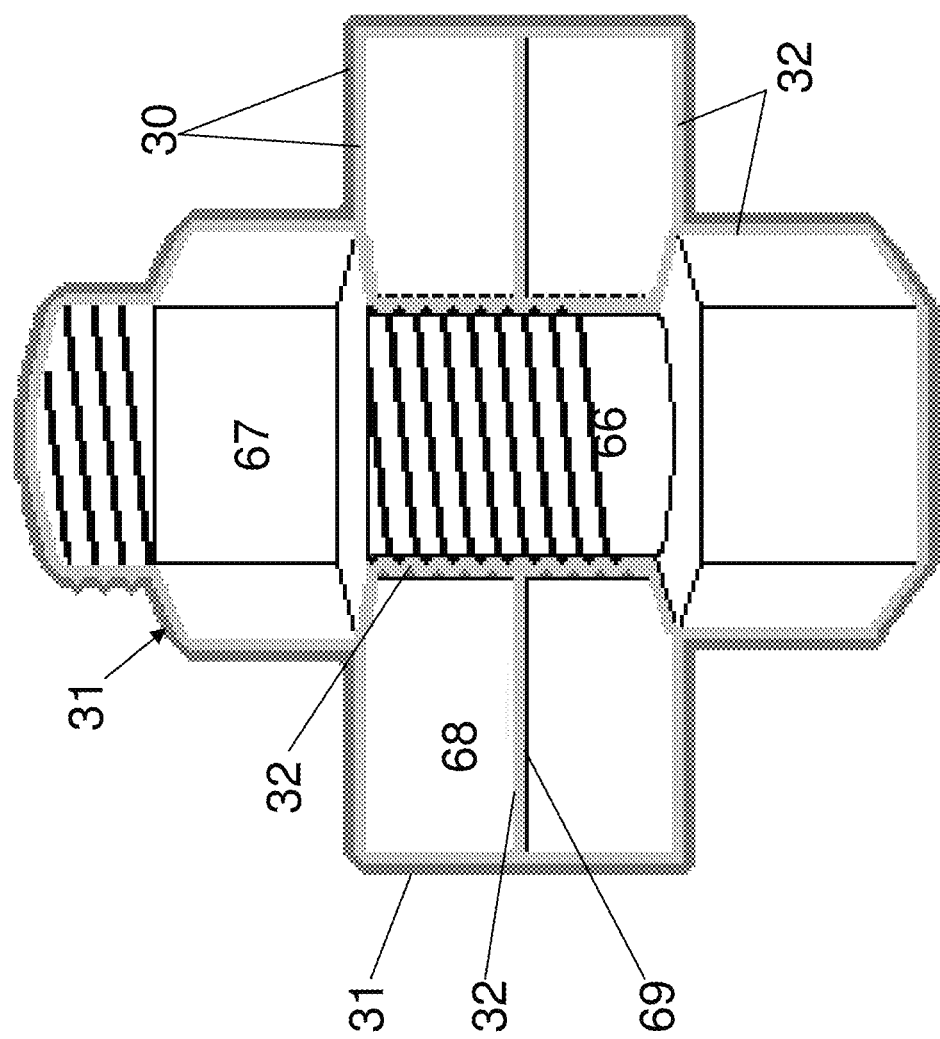
FIG. 2 shows a cross sectional view of a bolting assembly encased in thermoplastic.

FIG. 2 depicts a bolting assembly, more specifically bolt 66, nut 67 and flange 68, coated with thermoplastic 30. Enviropeel E170 from Alocit & Enviropeel USA of Indianapolis, Ind. is the preferred thermoplastic, but the invention could be carried out with other thermoplastics having similar characteristics such as a melting point of approximately 170° C., at which time it becomes a sprayable liquid, and hardening at 110-130° C., at which the material is in a semi solid state.

As shown in FIG. 2, thermoplastic 30 is preferably sprayed onto the substrate so that contours of the substrate are coated, regardless of size and shape. Thermoplastic 30 migrates into two layers: outer skin 31 and inhibition layer 32. Outer skin 31 acts as a barrier to the ingress of oxygen and water. Inhibition layer 32, preferably an inhibiting oil, disperses to cover every surface and crevice of the substrate within the skin. By way of example, inhibiting layer 32 enters crevice 69 of flange 68, although outer skin 31 does not. The barrier system can be used on substrates where corrosion already exists to stop further corrosion, and to prevent galvanic, pitting and crevice deterioration.

FIGS. 3A-3F depict the major components and steps associated with an above-water riser clamp barrier.

Figure 3A:
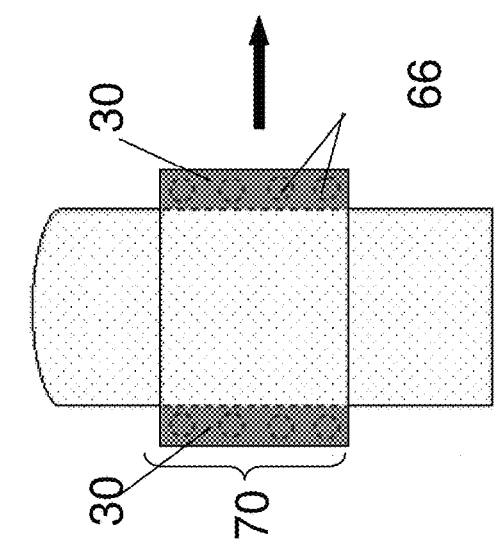

FIG. 3A generically depicts riser clamp 64 connecting two segments of pipe 62 in the untreated state. As a preliminary step it is desirable to remove loose or flaking debris from substrate, for example by brushing with a light wire brush.

Figure 3B:
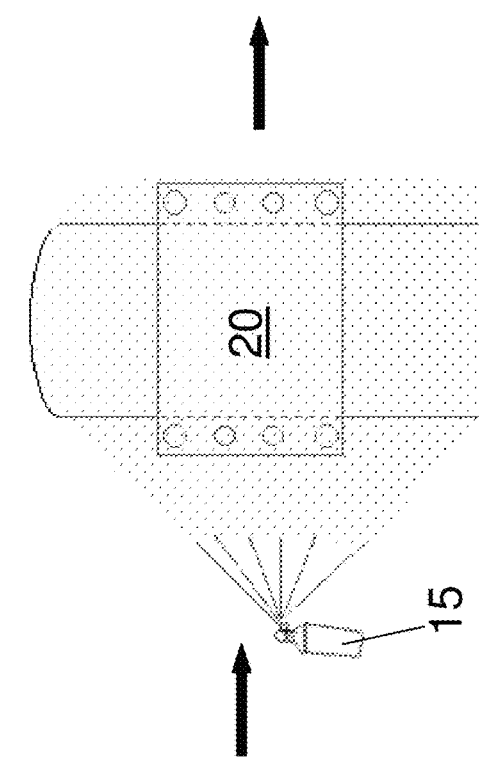

The cleaned substrate is then optionally sprayed with primer 20, as shown in FIG. 3B. An example of a suitable primer is Alocit 28.14 supplied by A&E Systems and Alocit USA located in Indianapolis, Ind. and it is preferably applied by sprayer 15, preferably using an airless spray system with minimum 33:1 ratio pump. It should be understood that specifics on primer application are dependent on primer(s) used and substrate condition, and that proper surface preparation should be used based on primer manufacturer specifications.

Figure 3C:
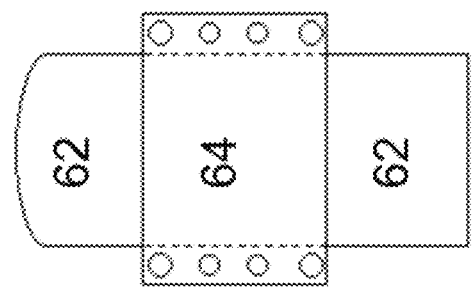

Next, bolts 66 and surrounding areas (collectively studs 70) are sprayed with thermoplastic 30. This is preferably accomplished by heating thermoplastic to 170° C., and using a manufacturer specified heated application machine, for example a sprayer, to deposit 6-8 mm of thermoplastic on the surface. It is desirable to apply two coats of the thermoplastic to achieve proper film thickness of 6-8 mm, although the manufacturer's specifications should be considered if otherwise is suggested. It is important that all surfaces to be protected are covered at this thickness with no voids. Typically, the secondary coat may be applied immediately following the initial coat. This step is depicted in FIG. 3C. Once the thermoplastic cools to approximately 110° C., it will assume a rubbery solid state.

Figure 3D:
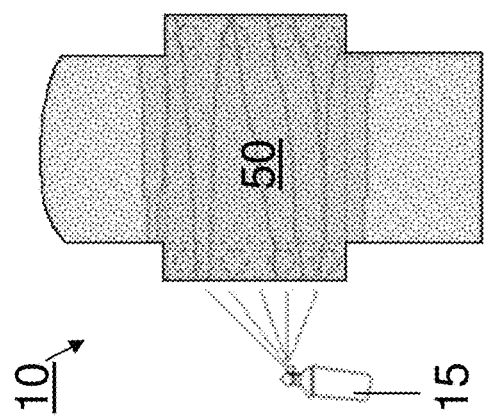

Next, remainder of riser clamp 64 is sprayed with thermoplastic 30, along with neck 65 of pipe 62, as shown in FIG. 3D. This seals the riser clamp in thermoplastic.

Figure 3E:
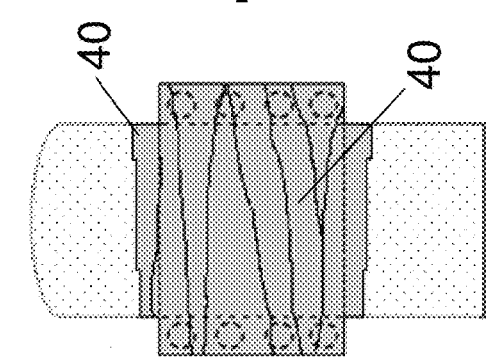

In FIG. 3E, the thermoplastic coated area is covered in protective wrap 40. This is preferably accomplished by wetting the wrap to activate the curing process, then installing the wrap from bottom of substrate to top of substrate so that overlapping edges properly shed moisture. Each wrap should overlap the previous wrap by approximately 50%. Two layers of wrap are recommended. The preferred wrap is Enviropeel Protective Tape from Enviropeel USA of Indianapolis, Ind. Other acceptable tapes would be fast curing, moisture activated, stretchable during installation, UV resistant, and paintable. Wrap 40 is allowed to completely cure. It takes approximately 2 hours for wrap to cure, at which point the shore hardness is approximately 83.

Figure 3F:
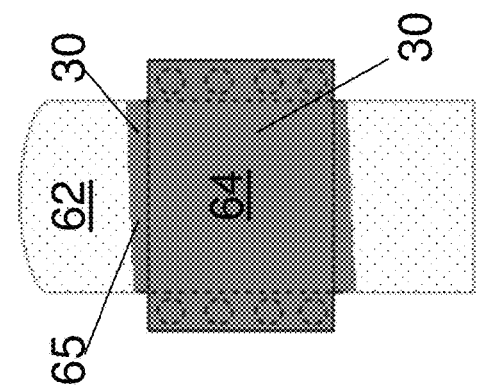

As shown in FIG. 3F, epoxy 50 is sprayed to completely encase protective wrap 40. This is preferably accomplished using an airless spray unit with 63:1 pump to deposit Alocit 28.15 from A&E Systems and Alocit & Enviropeel USA of Indianapolis, Ind. Under normal conditions the epoxy is cured after approximately 6-8 hours, at which time the surface is dry to the touch. The riser clamp now has an impervious barrier that is suitable for use above water. Polyurethane coatings may be used instead of Alocit as a top coat and to provide additional UV protection, so long as they are durable, fast curing, and impart UV stability.

Although not shown, sections of barrier system 10 can be cut and removed in order to inspect the underlying infrastructure, then patched with the appropriate components of thermoplastic, wrap and epoxy, without compromising the integrity of the barrier.

It is important to understand that the system and method of FIGS. 3A-3F pertains to bolting assemblies that are generally above water, and generally above the splash zone. The above water system provides substantial protection, while the splash zone system of FIGS. 4A-4J provides maximum protection.

FIGS. 4A-4J depict the major components and steps associated with a riser clamp barrier in the splash zone.

Some components and steps are similar to those in an above water riser clamp barrier, and therefore the descriptions associated with FIGS. 3A-3F should be referred to as appropriate.

FIG. 4A generically depicts riser clamp 64 connecting two segments of pipe 62 in the untreated state. As a preliminary step it is desirable to remove loose or flaking debris from substrate, for example by brushing with a light wire brush. Also, the splash zone riser clamp barrier should be constructed when the substrate is substantially dry and not likely to get wet, for example during low tide.

The cleaned substrate is then optionally sprayed with primer 20, as shown in FIG. 4B.

Next, studs 70 are sprayed with thermoplastic 30 and allowed to cool, as depicted in FIG. 4C.

Next, remainder of riser clamp 64 is sprayed with thermoplastic 30, along with neck 65 of pipe 62, as shown in FIG. 4D. This seals the riser clamp in thermoplastic.

FIG. 4E is a view taken along A-A of FIG. 4D, and shows the head-on view of one stud 70. It should be understood that a second stud would be on the other side of the pipe, but is obstructed in this view. In this step, circumference of studs 70 are swathed in wrap 40.

Upper and lower neck 65 is swathed in wrap 40 in FIG. 4F.

Figure 4G:
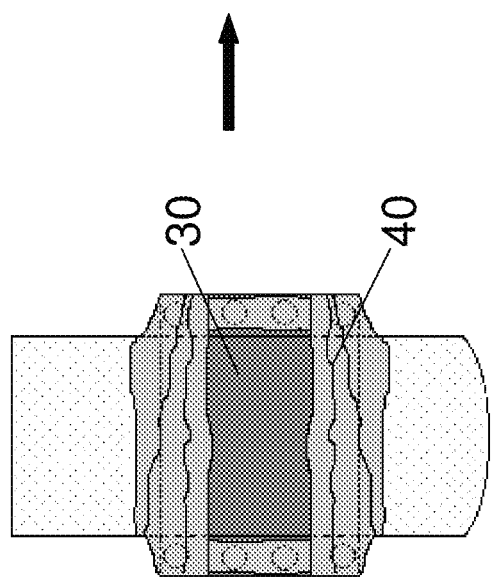
Figure 4H:
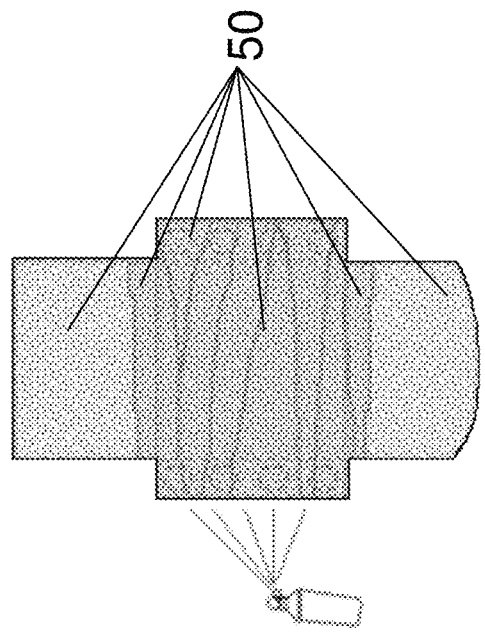

In FIG. 4G, wrap 40 continues downward from upper neck to enclose upper portion of wrapped studs 70. Similarly, in FIG. 4H, wrap 40 continues upward from lower neck to enclose lower portion of wrapped studs 70.

Figure 4I:
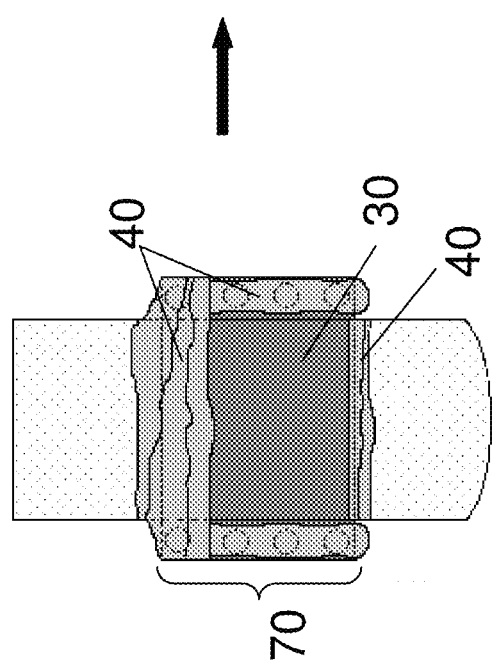

Swathing continues until riser clamp, adjoining necks and studs are completely encased in wrap 40. This is depicted in FIG. 4I.

Figure 4J:
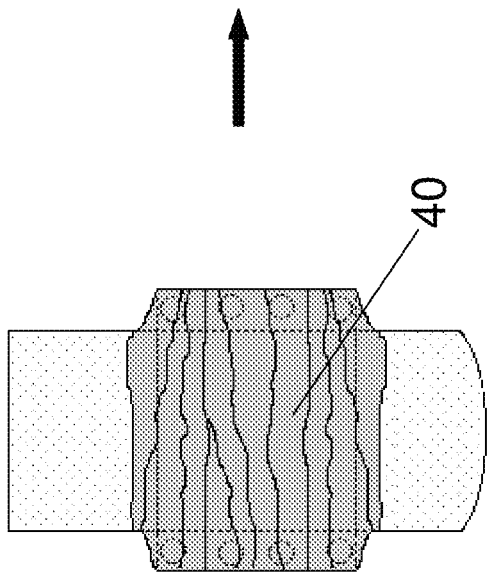

As shown in FIG. 4J, epoxy 50 is sprayed to completely encase protective wrap 40. The epoxy is allowed to harden. The riser clamp now has an impervious barrier that is suitable for the splash zone.

Certain modifications and improvements will occur to those skilled in the art upon a reading of the foregoing description. By way of example, the barrier system is suitable for use in gas platforms, mining, and power structure infrastructure including nuclear plants. Also, it is possible to manufacture components with the barrier included, rather than applying the barrier in situ. It should be understood that all such modifications and improvements have been deleted herein for the sake of conciseness and readability but are properly within the scope of the following claims.

We claim:

1. A barrier system for infrastructure including:
   A) A thermoplastic having an inhibition monolayer bound directly to an encapsulation region, and an outer skin monolayer in direct contact with said inhibition monolayer;
   B) A wrap layer bound directly to said outer skin monolayer, said wrap layer a moisture cured tape; and
   C) An epoxy layer bound directly to said wrap layer, wherein said barrier system is impervious.

2. The barrier system of claim 1 wherein said thermoplastic includes a sprayable liquid having a hardening point of 110-130° C.

3. The barrier system of claim 1 wherein said inhibition monolayer is an oil.

4. The barrier system of claim 1 wherein said wrap layer has a shore hardness of approximately 83 when cured.

5. The barrier system of claim 1 further comprising a primer layer bound to said encapsulation region.

6. The barrier system of claim 1 wherein said wrap layer substantially encloses said thermoplastic layer.

7. An impervious bolting assembly including:
   A) A bolt including low alloy steel;
   B) A thermoplastic including an outer skin monolayer substantially surrounding exposed portions of said bolt, said thermoplastic including a sprayable liquid having a hardening point of 110-130° C.;
   C) A moisture cured tape in direct contact with said outer skin monolayer and having a shore hardness of approximately 83 when cured; and
   D) An epoxy substantially surrounding and in direct contact with said thermoplastic.

8. The bolting assembly of claim 7 wherein said bolt in engaged with a riser clamp.

9. The bolting assembly of claim 8 wherein said riser clamp is engaged with a pipe.

10. The bolting assembly of claim 7 wherein said thermoplastic is approximately 6 to 8 millimeters thick.

11. The bolting assembly of claim 7 wherein said thermoplastic has an outer surface profile whose contours are substantially similar to the outer surface profile contours of said exposed portions of said bolt.

* * * * *